Jan. 23, 1934.  E. W. GRIFFITH  1,944,658
METHOD OF MAKING HUB CAPS
Filed April 24, 1931
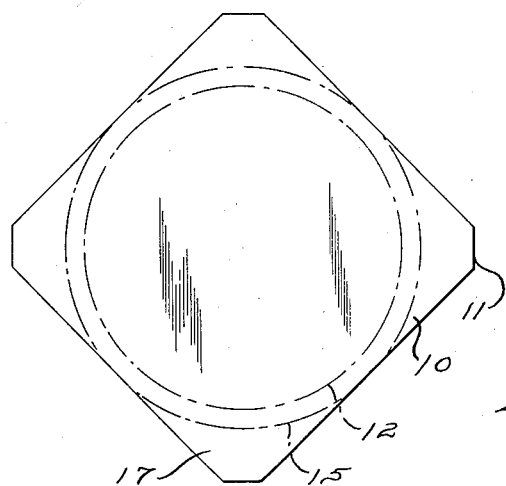
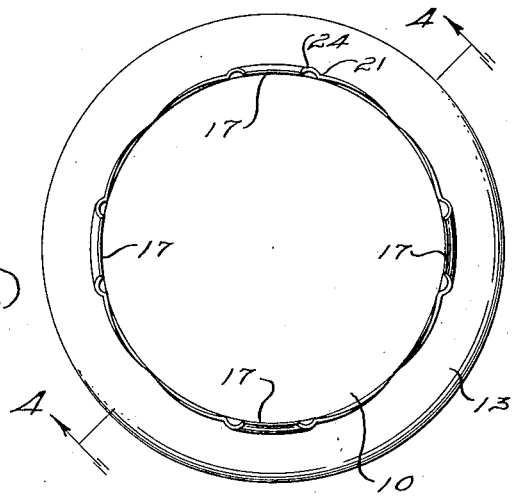
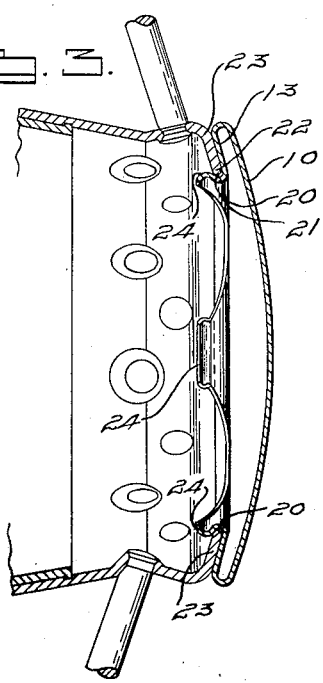
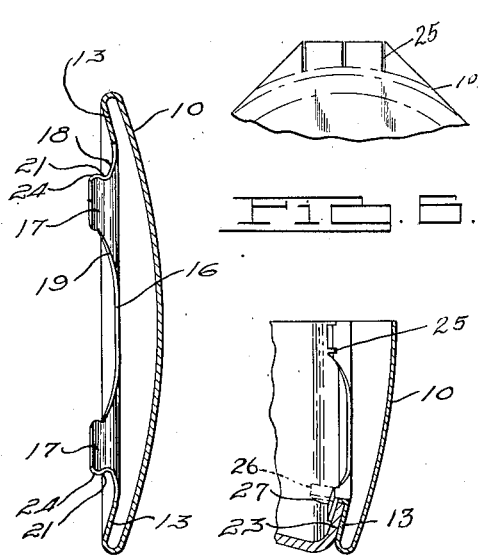
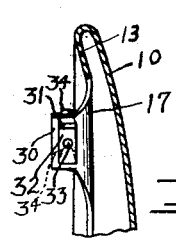
INVENTOR
Edward W. Griffith.
BY
Harness, Dickey, Pierce & Hann
ATTORNEYS.

Patented Jan. 23, 1934

1,944,658

UNITED STATES PATENT OFFICE 1,944,658

METHOD OF MAKING HUB CAPS

Edward W. Griffith, Detroit, Mich.

Application April 24, 1931. Serial No. 532,561

3 Claims. (Cl. 29—159.3)

The invention relates to hub caps for vehicle wheels and the principal objects thereof are to provide a method of manufacturing an article of this character by means of which manufacturing operations will be minimized and considerable waste ordinarily resulting in the manufacture of hub caps, will be avoided; and to provide a hub cap of simple and inexpensive construction which can readily be secured to a wheel hub.

For an understanding of the invention reference may be had to the accompanying drawing, wherein—

Fig. 1 illustrates a sheet metal section or blank from which the hub cap is manufactured;

Fig. 2 is an elevational view on a larger scale of a hub cap which has been manufactured from a sheet metal section or blank such as that shown by Fig. 1;

Fig. 3 is a fragmentary cross-sectional view of a wheel hub illustrating the manner in which the hub cap shown by Fig. 2 is attached to the hub;

Fig. 4 is a cross-sectional view taken substantially along the line 4—4 of Fig. 2;

Fig. 5 is a fragmentary cross-sectional view of a wheel hub having a hub cap similar to that shown by Fig. 3 but which is attached to the hub in a slightly different manner.

Fig. 6 is a fragmentary view of a sheet metal section or blank, similar to that shown by Fig. 1, from which the hub cap shown by Fig. 6 is manufactured.

Fig. 7 is a fragmentary view of a hub cap constructed according to another form of the invention.

At the present time many vehicle wheels are provided with relatively large hubs having correspondingly large openings. For enhancing the appearance of the wheel and for preventing dirt and other foreign matters from getting into the interior of the hub it is customary to close the opening therein by a hub cap of corresponding dimensions which is releasably secured thereto. The following description relates to a hub cap of this general character and a method of manufacturing it economically.

According to one form of the invention the hub cap is manufactured from a single sheet metal section 10, as shown by Fig. 1, which preferably is of square shape with the corners of the section removed as indicated at 11. On the section shown by Figure 1, two circles have been drawn in broken lines. The inner circle indicated at 12 defines the circumference of the hub cap which is to be manufactured. The metal outwardly of the circle 12 is reversely bent as indicated at 13 in Figs. 3 and 4 for the purpose of avoiding a sharp edge around the periphery of the hub cap. Also bending the metal margin of the section in this manner deflects the corner portions thereof into such positions that they may be utilized as projections for securing the hub cap to the hub of the wheel. The outer circle shown by Fig. 1, which is indicated at 15, defines the margin of the reversely bent portion 13 of the cap or, in other words, the inner peripheral edge of the reversely bent portion which is indicated at 16 in Figure 4. It, of course, should be understood that in bending the marginal portion of the metal section in this manner, suitable dies may be utilized and their character and the manner of bending the metal in this manner will be clearly understood by those skilled in the art without requiring illustration of particular dies to be employed.

It is apparent from Fig. 1 and Fig. 4 that outwardly of the circle 15 and the corresponding inner edge of the reversely bent portion 13, corner shaped securing projections 17 are provided, each of which has converging edges 18 and 19. As best shown by Fig. 3, each of the projections 17 is arcuately bent to provide a circumferentially extending groove 21 which is adapted to receive the inner marginal edge 22 of a hub 23, which defines a relatively large central opening in the latter. Preferably the marginal edge 22 of the hub is rounded or provided with converging side surfaces for facilitating mounting the hub cap on the hub and removing it therefrom. Each of the projections 17 also is arcuately bent as indicated at 24 but in a direction opposite to the manner in which the arcuate portion 21 is bent, for the purpose of facilitating movement of the projections past the edge 22 of the hub.

In mounting a hub cap such as that described on the hub 23, initial movement of the projections 17 through the central opening in the hub results in an engagement of the arcuate portions 24 of the projections with the inner edge 22 of the hub. The projections are so positioned that they must be deflected toward the center of the hub cap before they can be moved entirely through the opening in the hub, and consequently when they are finally moved through the opening, the arcuate portions 24 automatically revert to their former positions because of the resiliency thereof, and engage the inner wall of the hub around the central opening therein and secure the hub cap in position. The cap may be easily removed by forcing a screw driver, for example, in between the reversely bent portion 13 of the cap and the hub 23, which causes an inward deflection of the projections 17 to such extent that they can be moved outwardly through the central opening in the hub.

The hub cap illustrated by Fig. 5 is manufactured from a metal blank of polygonal contour similar to that of the blank shown by Fig. 1, but with the exception that the corner portions or projections are provided with slots 25 extending toward the center portion of the blank. Initially the blank is bent by means of suitable dies to form the reversely bent flange 13, and the corner portions are bent at substantially right angles to the flange as indicated in broken lines at 26 in Fig. 5. Then the hub cap is mounted on the hub with the projections 26 extending through the opening in the latter. Then by means of suitable tools, operated through the opening in the opposite end of the hub, the projections 26 are bent outwardly and against the inner wall of the hub as indicated at 27, thereby securing the hub cap on the hub. A cap of this character ordinarily would not be removed. It is apparent that the slots 25 facilitate bending the projections in the manner described.

In the construction shown by Fig. 7, each of the projections 17 on the metal blank 10 from which the hub cap is manufactured, is provided with rectangular openings 31 adjacent each side edge of the projection. The metal blank is then bent by means of dies into the shape shown, with the projections so disposed that the end portions thereof, indicated at 30, extend substantially axially of the cap. Then a resilient strip of metal 31 having angled end portions 34, is riveted intermediate its ends as indicated at 33, to each projection, with an end portion 34 projecting through a slot 31. The tips of the angled end portions 34 have beveled edges for facilitating their movement through the opening in the hub. In mounting a hub cap of this type on the wheel hub, the projections 17 are moved through the opening in the hub, during which the angle portions 34 on the metal strip 32 engage the hub margin 22 defining the opening in the hub, and are deflected radially toward the hub axis sufficiently to permit movement of the projections through the hub opening. Then the angle portions 34 spring outwardly into engagement with the inner wall of the hub and retain the cap in position.

It is apparent that either of the hub caps can easily be manufactured from a single sheet metal section and that in manufacturing it, waste is reduced to a minimum. Manufacturing hub caps in this manner has reduced the cost of articles of this character considerably not only because of the avoidance of waste but because it is a relatively simple matter to form the hub cap from a single sheet metal section by means of suitable dies.

Although only certain forms of the invention have been described and illustrated in detail, it will be apparent to those skilled in the art that various modifications may be made without departing from the scope of the appended claims.

I claim:

1. The method of manufacturing a wheel hub cap which comprises forming a substantially square piece of sheet metal, reversely bending the entire edge of the sheet around a circular area to provide an annular flange directed toward the axis of the cap, and bending the corners thus projected inwardly at an angle to the flange to provide substantially axial lips at four circumferentially spaced points for securing the cap to a wheel hub.

2. The method of manufacturing a wheel hub cap which comprises forming a substantially equilateral polygon of sheet metal, reversely bending the entire outer edge portion of the sheet around a circular area to provide an annular flange directed toward the axis of the cap, and bending the corners of the metal at an angle to the flange to provide substantially axial projections for securing the cap to a wheel hub.

3. The method of manufacturing a wheel hub cap which comprises forming a substantially equilateral polygon of sheet metal, reversely bending the entire outer edge portion of the sheet to provide an annular flange directed toward the axis of the cap, and bending the corners of the metal at an angle to the flange to provide substantially axial projections for securing the cap to a wheel hub.

EDWARD W. GRIFFITH.